United States Patent
Hatano et al.

(10) Patent No.: US 11,997,171 B2
(45) Date of Patent: May 28, 2024

(54) COMMUNICATION APPARATUS AND COMMUNICATION METHOD

(71) Applicant: NIPPON TELEGRAPH AND TELEPHONE CORPORATION, Tokyo (JP)

(72) Inventors: Tomoya Hatano, Musashino (JP); Manabu Yoshino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 40 days.

(21) Appl. No.: 17/631,198

(22) PCT Filed: Aug. 2, 2019

(86) PCT No.: PCT/JP2019/030555
§ 371 (c)(1),
(2) Date: Jan. 28, 2022

(87) PCT Pub. No.: WO2021/024315
PCT Pub. Date: Feb. 11, 2021

(65) Prior Publication Data
US 2022/0182466 A1 Jun. 9, 2022

(51) Int. Cl.
*H04L 67/00* (2022.01)
*H04L 12/44* (2006.01)

(52) U.S. Cl.
CPC .............. *H04L 67/34* (2013.01); *H04L 12/44* (2013.01)

(58) Field of Classification Search
CPC ......... H04L 67/00; H04L 67/34; H04L 12/28; H04L 12/44; H04L 12/2861;
(Continued)

(56) References Cited

U.S. PATENT DOCUMENTS

| 8,351,786 B2 * | 1/2013 | Ansari ............... H04J 14/0247 398/58 |
| 2003/0035368 A1 * | 2/2003 | Tanada ................ H04Q 3/0079 370/216 |

(Continued)

FOREIGN PATENT DOCUMENTS

| CA | 3087285 C * | 10/2023 | .......... H04B 10/272 |
| JP | 200360666 A | 2/2003 | |

(Continued)

OTHER PUBLICATIONS

NTT Access Service Systems Laboratories, "Welcome to the FASA Home Page", Nippon Telegraph and Telephone Corporation, Jan. 23, 2018 (Reading Day), http://www.ansl.ntt.co.jp/j/FASA/index.html.

*Primary Examiner* — James N Fiorillo
(74) *Attorney, Agent, or Firm* — Harness, Dickey & Pierce, P.L.C.

(57) ABSTRACT

A communication device in a communication system in which functions that are converted to software are configured as a plurality of components, and the functions are realized as a result of the components being respectively executed by a plurality of communication devices that are connected to a network, the communication device including a sorting unit configured to acquire a signal that is transmitted by a first component and transmit the signal to a second component indicated by destination information that is added to the signal by the first component.

3 Claims, 9 Drawing Sheets

(58) Field of Classification Search
CPC ..... H04L 12/2885; H04L 41/04; H04L 41/34; G06F 9/4416; H04Q 11/00; H04Q 11/0067; H04Q 2011/0086; H04B 10/00; H04B 10/032; H04B 10/272; H04J 14/00
USPC ........................................................ 709/224
See application file for complete search history.

(56) References Cited

U.S. PATENT DOCUMENTS

| | | | | |
|---|---|---|---|---|
| 2008/0040504 | A1* | 2/2008 | You | H04L 47/70 709/238 |
| 2009/0060531 | A1* | 3/2009 | Biegert | H04J 14/0232 398/214 |
| 2009/0109972 | A1* | 4/2009 | Chen | H04L 12/1877 370/392 |
| 2010/0002591 | A1* | 1/2010 | Mizutani | H04Q 11/0062 370/468 |
| 2013/0083673 | A1* | 4/2013 | Chow | H04L 12/2885 370/252 |
| 2014/0219654 | A1* | 8/2014 | Mitsui | H04B 10/032 398/45 |
| 2014/0308038 | A1* | 10/2014 | Zheng | H04Q 11/0067 398/68 |
| 2015/0281100 | A1* | 10/2015 | Kurita | H04L 45/127 370/230 |
| 2015/0288683 | A1* | 10/2015 | Cheng | H04L 63/0846 713/168 |
| 2020/0343975 | A1* | 10/2020 | Deng | H04B 10/272 |
| 2021/0266651 | A1* | 8/2021 | Luo | H04L 43/20 |
| 2021/0336699 | A1* | 10/2021 | Lin | H04Q 11/0067 |
| 2022/0078041 | A1* | 3/2022 | Li | H04Q 11/0067 |
| 2022/0232300 | A1* | 7/2022 | Xiang | H04B 11/0003 |
| 2022/0329321 | A1* | 10/2022 | Yoshino | H04Q 11/0067 |

FOREIGN PATENT DOCUMENTS

| | | |
|---|---|---|
| JP | 2015188186 A | 10/2015 |
| JP | 2018129011 A | 8/2018 |

* cited by examiner

Fig. 9

| FUNCTIONAL UNIT NAME | DEVICE NAME | PORT NO. |
|---|---|---|
| DEVICE INDEPENDENT APP UNIT A | NEARBY DEVICE | - |
| DEVICE INDEPENDENT APP UNIT B | REMOTE DEVICE | #1 |
| OLT FUNCTION MANAGEMENT UNIT | REMOTE DEVICE | #1 |
| DEVICE DEPENDENT APP UNIT | PON INTERFACE | #2 |

COMMUNICATION APPARATUS AND COMMUNICATION METHOD

CROSS-REFERENCE TO RELATED APPLICATIONS

This application is a 371 U.S. National Phase of International Application No. PCT/JP2019/030555, filed on Aug. 2, 2019. The entire disclosure of the above application is incorporated herein by reference.

TECHNICAL FIELD

The present invention relates to a communication device and a communication method.

BACKGROUND ART

Examples of communication systems that include communication devices include a PON (Passive Optical Network) system. The PON system includes an optical subscriber line terminal device (ONU: Optical Network Unit) that is installed in a house of a customer, for example, an optical subscriber line terminal station device (OLT: Optical Line Terminal) that is a communication device installed in a station building, and an optical distribution network (ODN). In some cases, the ODN connects a plurality of ONUs and a plurality of OLTs.

If a function of a communication device that is not largely dependent on at least any of standards to which the device conforms, the generation, scheme, system, device type, and manufacturing vendor of the device is configured as a component, and at least a portion of an input/output interface (IF) such as an application programming interface (API) of the function is clarified to increase versatility, portability, and extendibility, it is possible to easily share the function between devices that differ from each other in at least any of standards to which the devices conform, generation, scheme, system, device type, and manufacturing vendor, and it is possible to easily add a unique function (see NPL 1, for example).

CITATION LIST

Non Patent Literature

[NPL 1] "Welcome to FASA Home Page", [online], NTT Access Network Service Systems Laboratories, [searched on Jul. 10, 2019], Internet <URL:http://www.ans1.ntt.co.jp/j/FASA/index.html>

SUMMARY OF THE INVENTION

Technical Problem

When configuring functions of an OLT, which is a communication device, as components, the following cases are conceivable: a case where a PON interface unit and a computing unit are physically implemented by a single device, and a case where the PON interface unit and the computing unit are implemented by two or more devices (or platforms) in a distributed manner. In the case where these units are implemented by a single device, a WBS (White Box Switch) is used, for example.

On the other hand, in a case where these units are implemented by three devices (or platforms) in a distributed manner, for example, a configuration is conceivable in which the functions are separated between an SPF (Small Form-factor Pluggable)-type OLT that functions as the PON interface unit, a switch (hereinafter referred to as a "SW") that accommodates the SPF-type OLT, and a device (e.g., a server) that functions as the computing unit. In this case, a configuration is conceivable in which the SPF-type OLT takes on a function of communicating with ONUs in accordance with a PON protocol, the SW takes on a function of transferring main signals, and the device (e.g., server) that functions as the computing unit takes on a function of performing processing on control signals and a function of managing overall processing of OLT functions, for example. Note that the control signals referred to here are signals such as "GATE" and "GRANT" in DBA (Dynamic Bandwidth Allocation), signals relating to OMCI (ONU Management and Control Interface) and OAM (Operation Administration and Maintenance: operation, administration, and maintenance of a network), and the like, for example.

If the PON interface unit (e.g., the SFP-type OLT and the SW) and the computing unit (e.g., the server) that constitute the OLT are provided in a plurality of devices (or platforms) in a distributed manner as described above, control signals need to be transmitted and received between these functional units. Also, the plurality of devices including the functional units are sometimes installed at places that are apart from each other. For example, there is a case where functions such as the DBA function for which high-speed processing is required are implemented by a device that is installed in the vicinity of the SFP-type OLT, and functions such as the OAM function for which restrictions regarding time are relatively low are installed at a place (remote place) that is apart from the PON interface and are integrated into a single device corresponding to a plurality of PON interface units, for the sake of efficiency.

However, conventional technologies are designed on the assumption that the plurality of devices constituting the OLT are installed close to each other and are communicably connected directly to each other. Therefore, even when communication is performed between an SPF-type OLT and a device (hereinafter referred to as a "nearby device") such as a server that is installed in the vicinity of the SPF-type OLT, the communication needs to be performed via a functional unit (hereinafter referred to as a "management unit") that manages overall processing of the OLT. This is the case even if the management unit is included in a device (hereinafter referred to as a "remote device") such as a server that is installed at a remote place, and in such a case, there is a problem in that communication delay occurs. Conventionally, this problem has been fatal in particular for a function for which high-speed processing is required, for example.

The present invention was made in view of the above circumstances, and has an object of providing a technology that can suppress occurrence of communication delay.

Means for Solving the Problem

An aspect of the present invention is a communication device in a communication system in which functions that are converted to software are configured as a plurality of components, and the functions are realized as a result of the components being respectively executed by a plurality of communication devices that are connected to a network, the communication device including a sorting unit configured to acquire a signal that is transmitted by a first component and transmit the signal to a second component indicated by destination information that is added to the signal by the first component.

Another aspect of the present invention is a communication method to be executed with a communication system in which functions that are converted to software are configured as a plurality of components, and the functions are realized as a result of the components being respectively executed by a plurality of communication devices that are connected to a network, the communication method including a sorting step of acquiring a signal that is transmitted from a first component and transmitting the signal to a second component indicated by destination information that is added to the signal by the first component.

Effects of the Invention

According to the present invention, occurrence of communication delay can be suppressed.

BRIEF DESCRIPTION OF DRAWINGS

FIG. 9 is a diagram showing a list that is referred to by a signal sorting unit according to the fifth embodiment of the present invention.

DESCRIPTION OF EMBODIMENTS

Figure 1:
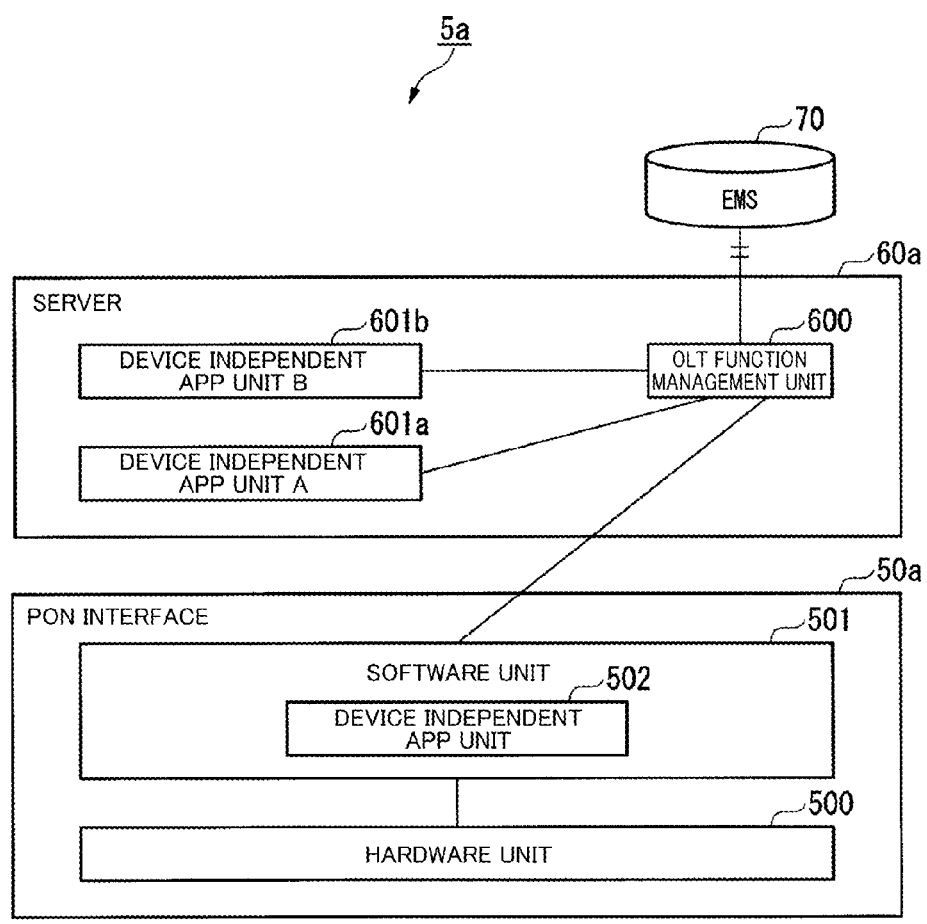
FIG. 1 is a block diagram showing a functional configuration of a communication system according to a conventional technology.

The following describes embodiments of the present invention with reference to the drawings. In each of the embodiments described below, a communication system is assumed in which functions of an OLT (optical subscriber line terminal station device) are configured as a plurality of components, and the components are provided in a distributed manner in a device that functions as a PON interface unit and devices that function as computing units.

Note that the device that functions as the PON interface unit is a PON interface 50a, an SFP-type OLT+SW 50b, a PON interface 10a, a SW 10b, a PON interface 10c, a PON interface 10d, or the PON interface 10e, which will be described later, for example. Also, the devices that function as the computing units are a server 60a, a nearby device 60b-1 and remote devices 60b-2 and 60b-3, a nearby device 20a-1 and remote devices 20a-2 and 20a-3, a nearby device 20b-1 and remote devices 20b-2 and 20b-3, a nearby device 20c-1 and a remote device 20c-2, a nearby device 20d-1 and a remote device 20d-2, or a nearby device 20e-1 and a remote device 20e-2, which will be described later, for example.

To facilitate understanding of descriptions of functional configurations of communication systems according to the embodiments of the present invention, first, configurations of communication systems according to conventional technologies will be described. FIG. 1 is a block diagram showing an example configuration of a communication system according to a conventional technology.

A communication system 5a shown in FIG. 1 is a system that communicates with another communication device (e.g., ONU) using signals (e.g., optical signals) transmitted via an optical fiber network such as an ODN in a PON. The communication system 5a functions as an OLT in the PON.

As shown in FIG. 1, the communication system 5a includes a PON interface 50a, a server 60a, and an EMS 70.

The PON interface 50a and the server 60a include components that are hardware, software, or a combination of hardware and software, or functions that are configured as components. For example, the PON interface 50a and the server 60a include software components such as applications that realize functions or the like that differ between services or telecommunications carriers, using a general-purpose input/output interface, and fundamental constitutional elements of an access network device that provide the general-purpose input/output interface to the software components and provide functions that need not be changed according to a service or a request because the functions are standardized, for example. An example of the general-purpose input/output interface is a FASA (registered trademark, Flexible Access System Architecture: new access system architecture) application API (see NPL 1). An example of the applications is a FASA (registered trademark) application (see NPL 1). An example of the fundamental constitutional elements of the access network device is a FASA (registered trademark) basis (see NPL 1). Owing to the use of the general-purpose input/output interface, functions can be easily added or replaced, and services can be flexibly and immediately provided for various requests.

Note that in the following description, an "application" may be referred to as an "app unit".

As shown in FIG. 1, the PON interface 50a includes a hardware unit 500 that is hardware that executes processing relating to the PON, and a software unit 501 that is software for executing the processing relating to the PON.

The software unit 501 includes a device dependent app unit 502 that is a functional unit having a configuration that is dependent on the hardware unit 500. That is, the device dependent app unit 502 is a functional unit that is dependent on standards to which the hardware unit 500 conforms or the manufacturing vendor of the device. In other words, the device dependent app unit 502 is a functional unit that is constituted by an application of which compatibility with other hardware is low and that cannot be used as is in newly manufactured hardware (in particular, hardware that conforms to different standards or is manufactured by a different manufacturing vendor). Note that a configuration is also possible in which the software unit 501 further includes a device independent app unit (not shown) that is a functional unit having a configuration that is not dependent on the hardware unit 500.

As shown in FIG. 1, the server 60a includes an OLT function management unit 600, a device independent app unit A 601a, and a device independent app unit B 601b.

The device independent app unit A 601a and the device independent app unit B 601b are functional units having configurations that are not dependent on the hardware unit 500. That is, the device independent app unit A 601a and the device independent app unit B 601b are functional units that are not dependent on standards to which the hardware unit 500 conforms and the manufacturing vendor of the device. In other words, the device independent app unit A 601a and the device independent app unit B 601b are functional units that are constituted by applications of which compatibility with other hardware is high and that can be used as is in newly manufactured hardware (in particular, hardware that conforms to different standards or is manufactured by a different manufacturing vendor).

Note that specific examples of applications included in the device independent app unit A 601a and the device independent app unit B 601b include an application for performing setting processing in a network device, an application for performing processing for changing settings, an application for monitoring, managing, or authenticating a network, and an application for performing algorithm processing.

The OLT function management unit 600 accepts input of control signals that are output from the EMS 70. Based on the control signals output from the EMS 70, the OLT function management unit 600 outputs various instructions and information for checking states or the like to the functional units of the communication system 5a. Also, the OLT function management unit 600 monitors changing and deletion of settings regarding the device independent app unit A 601a, the device independent app unit B 601b, the software unit 501, and the hardware unit 500.

Note that the EMS (Element Management System) 70 is a system that manages devices (i.e., the PON interface 50a and the server 60a) constituting the network.

The device dependent app unit 502, the device independent app unit A 601a, and the device independent app unit B 601b are functional units corresponding to functions of the OLT that are configured as components (converted to software). As described above, the device dependent app unit 502 is an application having a configuration that is dependent on the hardware unit 500 included in the PON interface 50a. Accordingly, the device dependent app unit 502 needs to be included in the software unit 501 of the PON interface 50a.

The device independent app unit A 601a and the device independent app unit B 601b include basic functions such as the DBA function and the OAM function of the OLT, for example. Also, the device independent app unit A 601a and the device independent app unit B 601b include an optional function and an edge computing function of the OLT, for example.

Note that a configuration is also possible in which the device independent app unit A 601a and the device independent app unit B 601b are included in the PON interface 50a.

Commonly, a plurality of devices including the above-described functional units are sometimes installed at places that are apart from each other. For example, there is a case where functions such as the DBA function for which high-speed processing is required are implemented by a device that is installed in the vicinity of an SFP-type OLT, and functions such as the OAM function for which restrictions regarding time are relatively low are implemented by a central device that is installed at a place (remote place) that is apart from the PON interface, for the sake of efficiency. The following describes an example configuration in such a case.

Figure 2:
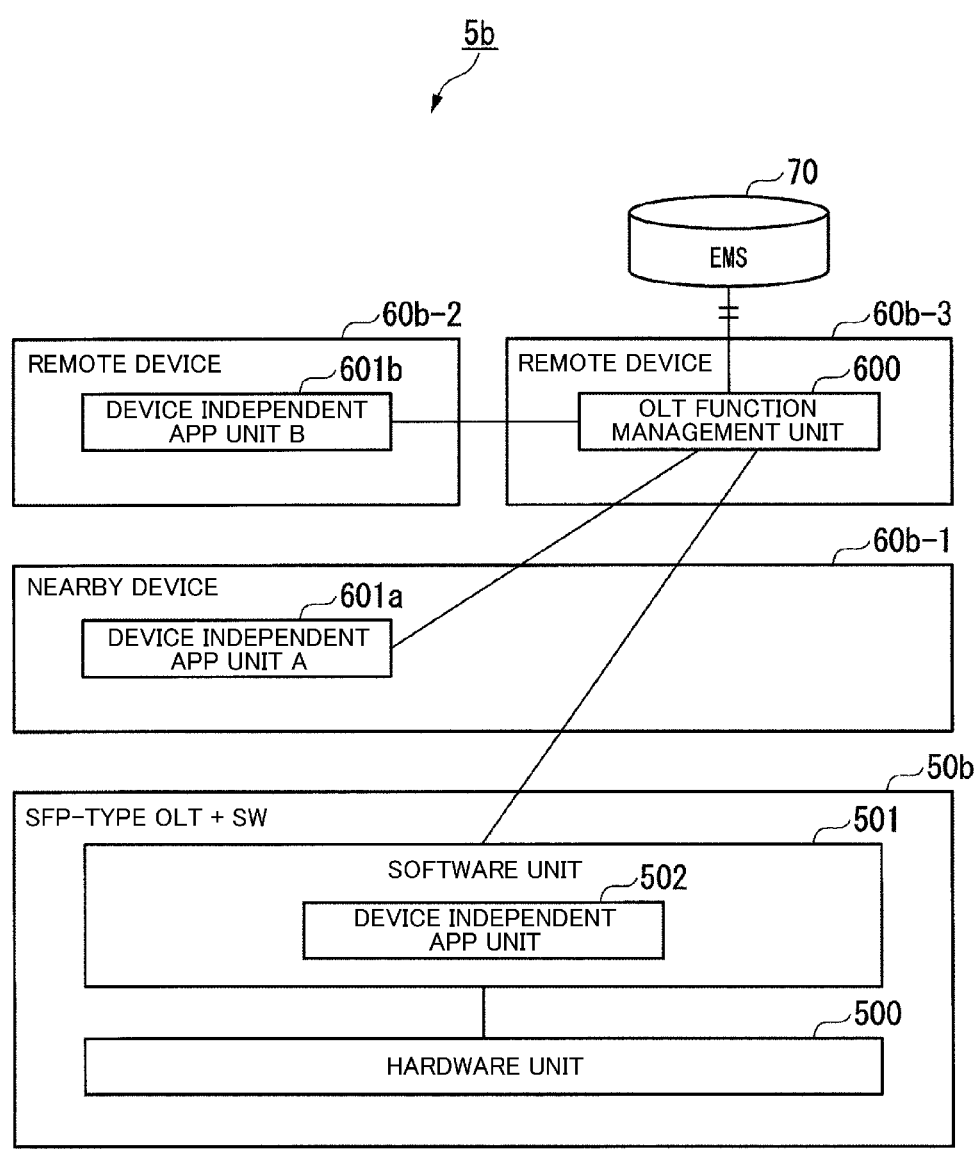
FIG. 2 is a block diagram showing another functional configuration of a communication system according to a conventional technology.

FIG. 2 is a block diagram showing another example configuration of a communication system according to a conventional technology. As shown in FIG. 2, a communication system 5b includes an SPF-type OLT+SW 50b, a nearby device 60b-1, a remote device 60b-2, a remote device 60b-3, and the EMS 70.

The functional configuration of the SPF-type OLT+SW 50b is the same as the functional configuration of the PON interface 50a shown in FIG. 1.

The nearby device 60b-1 is a device (e.g., a server) that is installed in the vicinity of the SPF-type OLT+SW 50b. The nearby device 60b-1 includes the device independent app unit A 601a.

The remote device 60b-2 and the remote device 60b-3 are devices (e.g., servers) that are collectively installed at a place (remote place) that is apart from the PON interface 50b for the sake of efficiency. The remote device 60b-2 includes the device independent app unit B 601b. Also, the remote device 60b-3 includes the OLT function management unit 600.

As shown in FIG. 2, when the software unit 501, the device independent app unit A 601a, and the device independent app unit B 601b communicate with each other, the communication always has to be performed via the OLT function management unit 600. For example, even communication that is performed between the software unit 501 and the device independent app unit A 601a, which are respectively included in the SPF-type OLT+SW 50b and the nearby device 60b-1 that are installed close to each other, needs to be performed via the OLT function management unit 600 included in the remote device 60b-3 that is installed at the remote place. This causes a problem in that communication delay occurs even between devices that are close to each other, and this problem is fatal in particular for a function for which high-speed processing is required, for example. In contrast, communication systems according to the following embodiments of the present invention can solve the above problem.

First Embodiment

The following describes a first embodiment of the present invention with reference to the drawings.
Configuration of Communication System The following describes the functional configuration of a communication system 1a.

Figure 3:
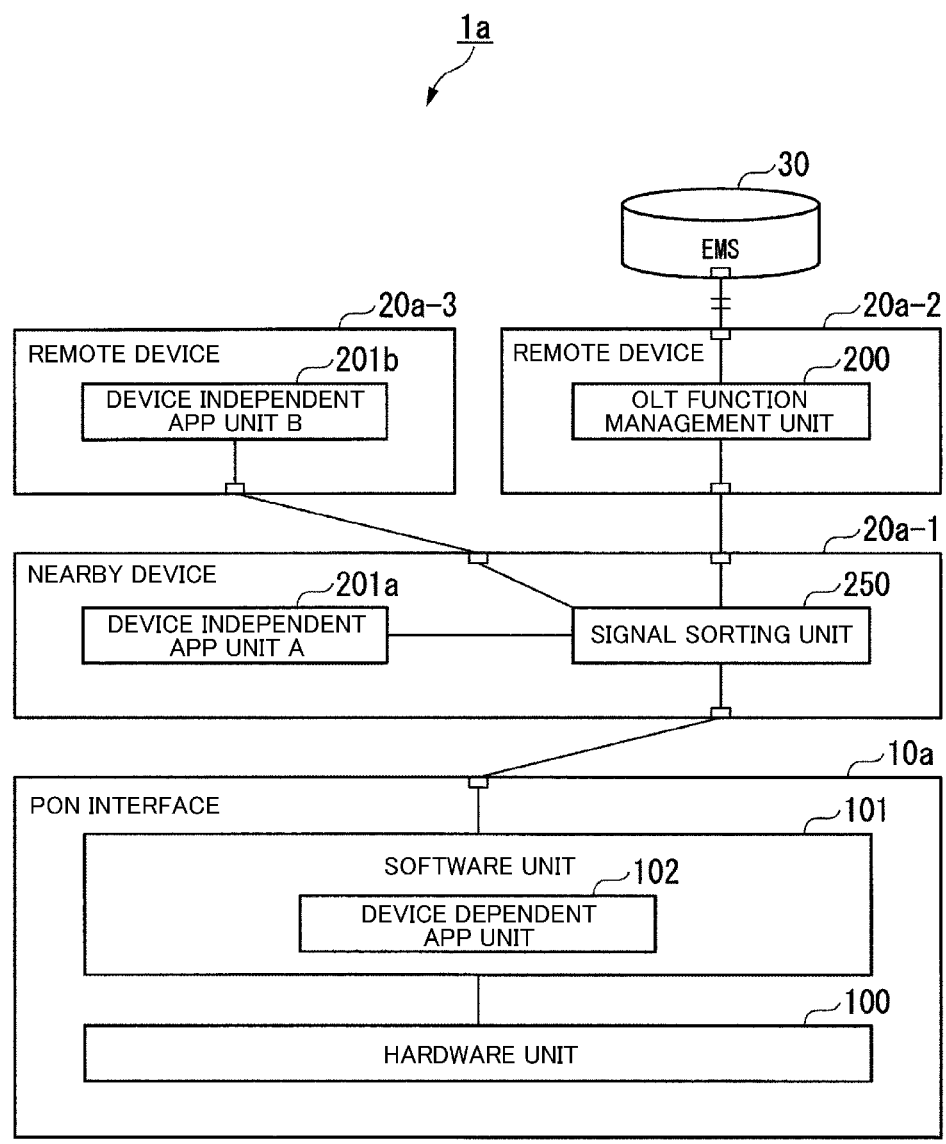
FIG. 3 is a block diagram showing a functional configuration of a communication system according to a first embodiment of the present invention.

FIG. 3 is a block diagram showing the functional configuration of the communication system 1a according to the first embodiment of the present invention.

The communication system 1a shown in FIG. 3 is a system that communicates with another communication device (e.g., ONU) using signals (e.g., optical signals) transmitted via an optical fiber network such as an ODN in a PON. The communication system 1a functions as an OLT in the PON.

As shown in FIG. 3, the communication system 1a includes a PON interface 10a, a nearby device 20a-1, a remote device 20a-2, a remote device 20a-3, and an EMS 30.

The PON interface 10a, the nearby device 20a-1, the remote device 20a-2, and the remote device 20a-3 include components that are hardware, software, or a combination of hardware and software, or functions that are configured as components.

As shown in FIG. 3, the PON interface 10a includes a hardware unit 100 that is hardware that executes processing relating to the PON, and a software unit 101 that is software for executing the processing relating to the PON.

The software unit 101 includes a device dependent app unit 102 that is a functional unit having a configuration that is dependent on the hardware unit 100. That is, the device dependent app unit 102 is a functional unit that is dependent on standards to which the hardware unit 100 conforms or the manufacturing vendor of the device. In other words, the device dependent app unit 102 is a functional unit that is constituted by an application of which compatibility with other hardware is low and that cannot be used as is in newly manufactured hardware (in particular, hardware that conforms to different standards or is manufactured by a different manufacturing vendor). Note that a configuration is also possible in which the software unit 101 further includes a device independent app unit (not shown) that is a functional unit having a configuration that is not dependent on the hardware unit 100.

The nearby device 20a-1 is a device (e.g., a server) that is installed in the vicinity of the PON interface 10a. The nearby device 20a-1 includes a device independent app unit A 201a and a signal sorting unit 250.

The signal sorting unit 250 sorts a processing signal that is transmitted from a functional unit (a first component) into a functional unit (a second component), referring to destination information that is included in the processing signal. The destination information is information with which the functional unit to which the processing signal is to be transmitted can be identified. Note that if the functional unit to which the processing signal is to be transmitted is included in the device (i.e., the nearby device 20a-1) that includes the signal sorting unit, the signal sorting unit 250 transmits the processing signal directly to the functional unit.

The remote device 20a-2 is a device (e.g., a server) that is collectively installed at a place (remote place) that is apart from the PON interface 10a for the sake of efficiency. The remote device 20a-2 includes an OLT function management unit 200.

The remote device 20a-3 is a device (e.g., a server) that is collectively installed at a place (remote place) that is apart from the PON interface 10a for the sake of efficiency. The remote device 20a-3 includes a device independent app unit B 201b.

When transmitting processing signals to another functional unit, the software unit 101, the OLT function management unit 200, the device independent app unit A 201a, and the device independent app unit B 201b add destination information to the processing signals and transmit the processing signals to the signal sorting unit 250.

As described above, in the communication system 1a according to the present embodiment, processing signals transmitted from the functional units (in the case of the PON interface 10a, the software unit 101) are first collected to the signal sorting unit 250 included in the nearby device 20a-1. When transmitting the processing signals to another functional unit, the functional units add destination information to the processing signals. Then, the functional units emit the processing signals from prescribed communication ports. Thus, the processing signals are sent to the signal sorting unit 250 of the nearby device 20a-1.

Upon acquiring each processing signal, the signal sorting unit 250 identifies a functional unit to which the processing signal is to be transmitted, by referring to destination information added to the processing signal. Then, the signal sorting unit 250 transmits the processing signal via a communication port that is connected to a device that includes the functional unit to which the processing signal is to be transmitted. Thus, the processing signal is sent to the functional unit to which the processing signal is to be transmitted. Note that if the functional unit to which the processing signal is to be transmitted is included in the device (i.e., the nearby device 20a-1) that includes the signal sorting unit, the signal sorting unit 250 transmits the processing signal directly to the functional unit, not via a communication port.

As described above, in the communication system 1a according to the first embodiment of the present invention, communication between functional units need not be performed via the OLT function management unit 200 included in the remote device 20a-2. Therefore, the communication system 1a can suppress occurrence of communication delay.

Operations of Signal Sorting Unit

The following describes an example of operations of the signal sorting unit 250.

Figure 4:
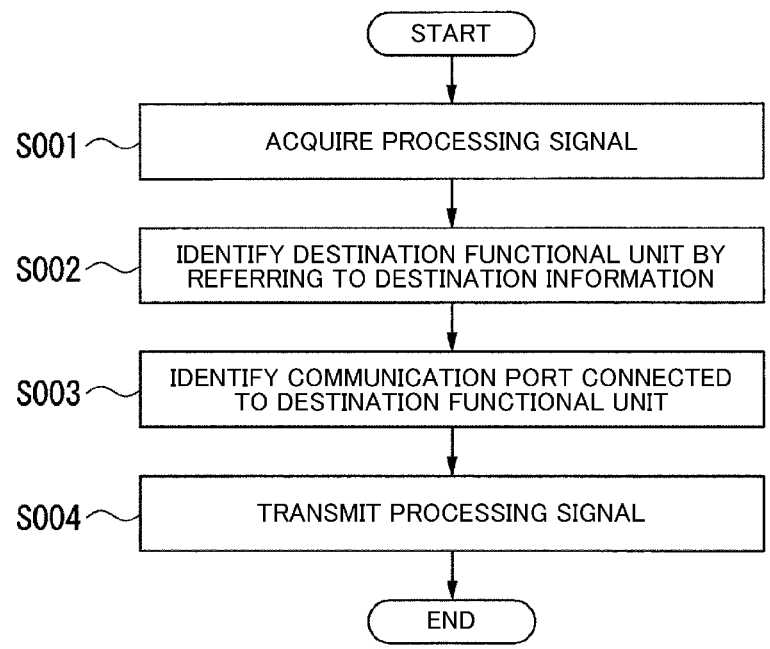
FIG. 4 is a flowchart showing operations of a signal sorting unit according to the first embodiment of the present invention.

FIG. 4 is a flowchart showing operations of the signal sorting unit 250 of the communication system 1a according to the first embodiment of the present invention. This flowchart starts when a processing signal is transmitted from a functional unit to the signal sorting unit 250.

The signal sorting unit 250 acquires the processing signal (step S001). The signal sorting unit 250 identifies a functional unit to which the processing signal is to be transmitted, by referring to destination information added to the processing signal (step S002). The signal sorting unit 250 identifies a communication port that is connected to the functional unit to which the processing signal is to be transmitted (step S003). The signal sorting unit 250 transmits the processing signal via the identified communication port (step S004). Through the above, the operations of the signal sorting unit 250 shown in the flowchart of FIG. 4 end.

Note that if the functional unit to which the processing signal is to be transmitted is included in the device that includes the signal sorting unit, the signal sorting unit 250 transmits the processing signal directly to the functional unit, not via a communication port. Note that a configuration is also possible in which the signal sorting unit 250 determines that the functional unit to which the processing signal is to be transmitted is included in the device including the signal sorting unit, based on a fact that a communication port connected to the functional unit is not identified, for example.

Second Embodiment

The following describes a second embodiment of the present invention with reference to the drawings.

Configuration of Communication System

The following describes the functional configuration of a communication system 1b.

Figure 5:
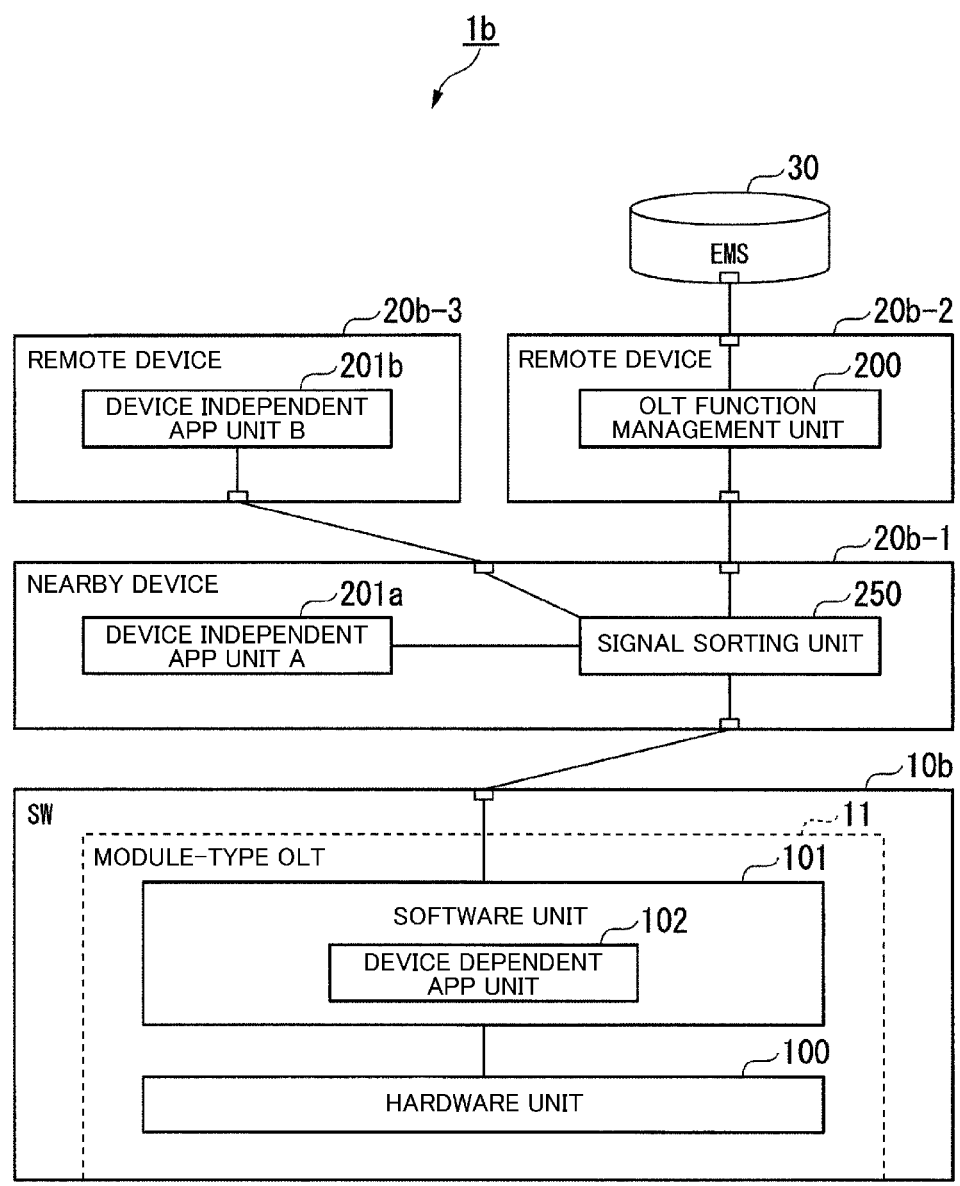
FIG. 5 is a block diagram showing a functional configuration of a communication system according to a second embodiment of the present invention.

FIG. 5 is a block diagram showing the functional configuration of the communication system 1b according to the second embodiment of the present invention.

As shown in FIG. 5, the configuration of the communication system 1b according to the present embodiment differs from the configuration of the communication system 1a according to the first embodiment described above in that the PON interface is constituted by a SW (switch) 10b and a module-type OLT 11 that is included in the SW 10b. Configurations of functional units of the communication system 1b are the same as the configurations of the functional units of the communication system 1a according to the first embodiment, and therefore the functional units are denoted with the same reference signs as those used in the first embodiment, and descriptions thereof are omitted.

As shown in FIG. 5, in the communication system 1b as well, processing signals transmitted from the functional units (in the case of the SW 10b, the software unit 101) are first collected to the signal sorting unit 250 included in a nearby device 20b-1, similarly to the communication system 1a according to the first embodiment. Upon acquiring each processing signal, the signal sorting unit 250 identifies a functional unit to which the processing signal is to be transmitted, by referring to destination information added to the processing signal. Then, the signal sorting unit 250 transmits the processing signal via a communication port that is connected to a device that includes the functional unit to which the processing signal is to be transmitted. Note that if the functional unit to which the processing signal is to be transmitted is included in the device (i.e., the nearby device 20b-1) that includes the signal sorting unit, the signal sorting unit 250 transmits the processing signal directly to the functional unit, not via a communication port.

As described above, in the communication system 1b according to the second embodiment of the present invention, communication between the functional units need not be performed via the OLT function management unit 200 that is included in a remote device 20b-2. Therefore, the communication system 1b can suppress occurrence of communication delay.

Third Embodiment

The following describes a third embodiment of the present invention with reference to the drawings.
Configuration of Communication System
The following describes the functional configuration of a communication system 1c.

Figure 6:
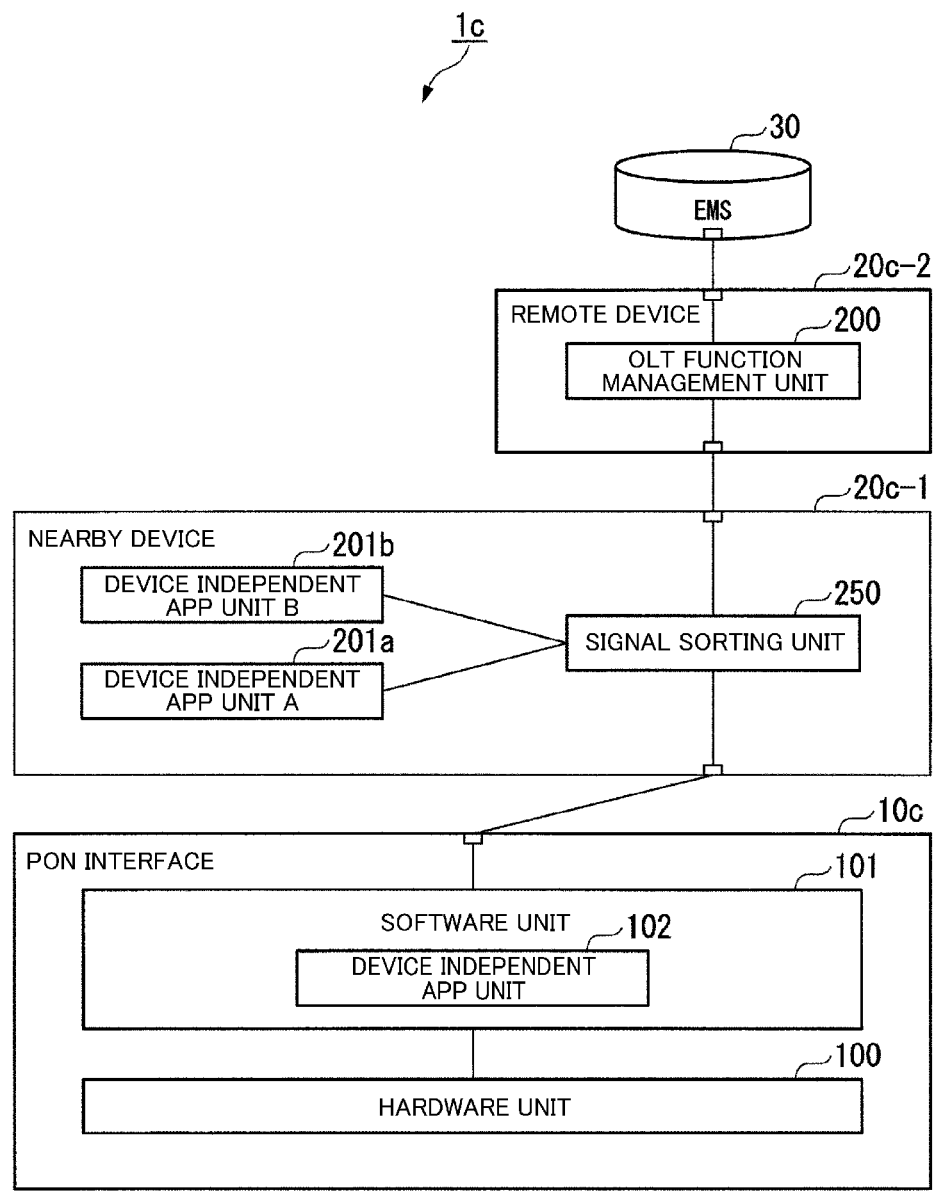
FIG. 6 is a block diagram showing a functional configuration of a communication system according to a third embodiment of the present invention.

FIG. 6 is a block diagram showing the functional configuration of the communication system 1c according to the third embodiment of the present invention.

As shown in FIG. 6, the configuration of the communication system 1b according to the present embodiment differs from the configuration of the communication system 1a according to the first embodiment described above in that the plurality of device independent app units are included in a nearby device 20c-1 (i.e., not only the device independent app unit A 201a but also the device independent app unit B 201b is included in the nearby device 20c-1). Configurations of functional units of the communication system 1c are the same as the configurations of the functional units of the communication system 1a according to the first embodiment, and therefore the functional units are denoted with the same reference signs as those used in the first embodiment, and descriptions thereof are omitted.

As shown in FIG. 6, in the communication system 1c as well, processing signals transmitted from the functional units are first collected to the signal sorting unit 250 included in the nearby device 20c-1, similarly to the communication system 1a according to the first embodiment. Upon acquiring each processing signal, the signal sorting unit 250 identifies a functional unit to which the processing signal is to be transmitted, by referring to destination information added to the processing signal. Then, the signal sorting unit 250 transmits the processing signal via a communication port that is connected to a device that includes the functional unit to which the processing signal is to be transmitted. Note that if the functional unit to which the processing signal is to be transmitted is included in the device (i.e., the nearby device 20c-1) that includes the signal sorting unit, the signal sorting unit 250 transmits the processing signal directly to the functional unit, not via a communication port.

As described above, in the communication system 1c according to the third embodiment of the present invention, communication between the functional units need not be performed via the OLT function management unit 200 that is included in a remote device 20c-2. Therefore, the communication system 1c can suppress occurrence of communication delay.

Fourth Embodiment

The following describes a fourth embodiment of the present invention with reference to the drawings.
Configuration of Communication System
The following describes the functional configuration of a communication system 1d.

Figure 7:
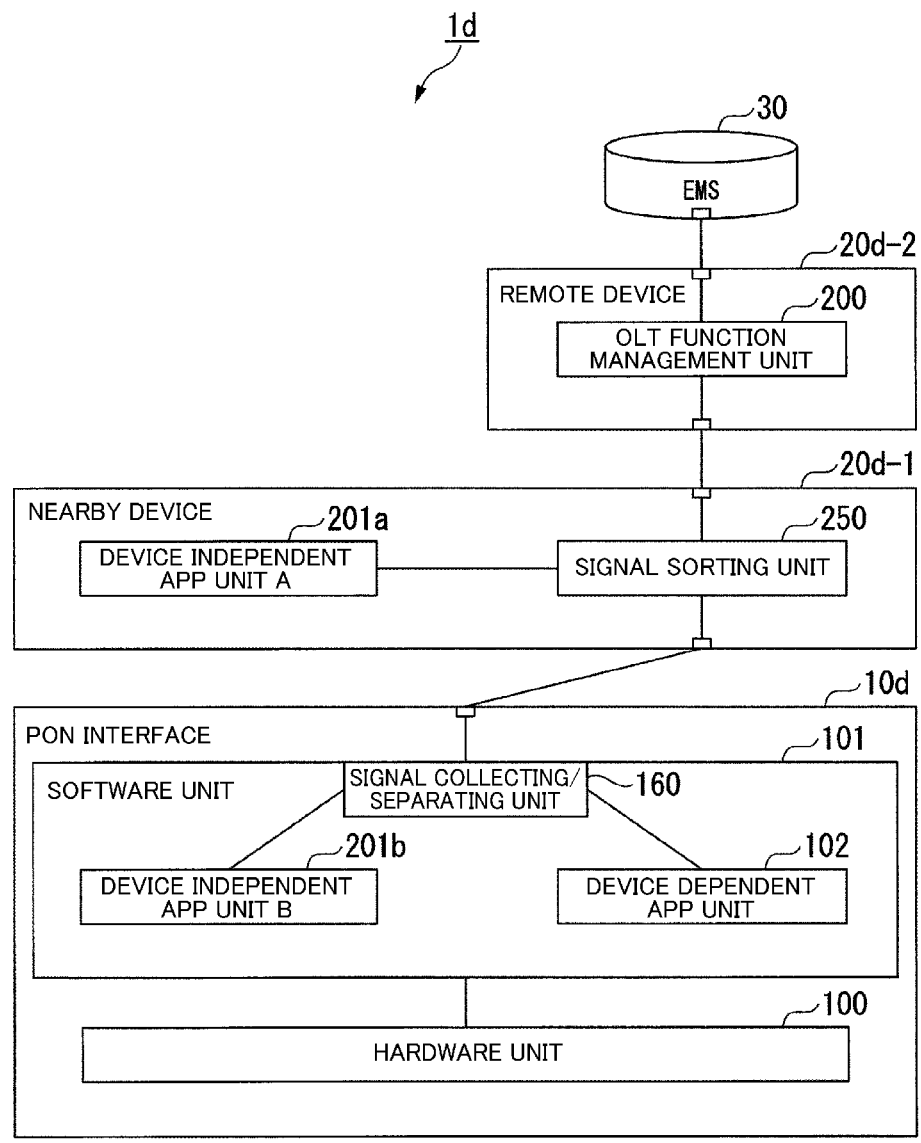
FIG. 7 is a block diagram showing a functional configuration of a communication system according to a fourth embodiment of the present invention.

FIG. 7 is a block diagram showing the functional configuration of the communication system 1d according to the fourth embodiment of the present invention.

As shown in FIG. 7, the configuration of the communication system 1d according to the present embodiment differs from the configuration of the communication system 1a according to the first embodiment described above in that a PON interface 10d includes a plurality of app units. The software unit 101 of the PON interface 10d includes the device dependent app unit 102, the device independent app unit B 201b, and a signal collecting/separating unit 160. Note that the plurality of app units included in the PON interface 10d may be device dependent app units or device independent app units.

The signal sorting unit 250 recognizes the plurality of functional units (app units) included in the software unit 101 of the PON interface 10d in advance. More specifically, the signal sorting unit 250 can refer to a list (not shown) of the functional units included in the software unit 101, for example. Thus, the signal sorting unit 250 can determine whether or not the functional unit to which the processing signal is to be transmitted is a functional unit included in the software unit 101. Note that the above-described list (management table) is stored on a storage medium (not shown) included in a nearby device 20d-1 in advance, for example.

As shown in FIG. 7, in the communication system 1d as well, processing signals transmitted from the functional units are first collected to the signal sorting unit 250 included in the nearby device 20d-1, similarly to the communication system 1a according to the first embodiment. Upon acquiring each processing signal, the signal sorting unit 250 identifies a functional unit to which the processing signal is to be transmitted, by referring to destination information added to the processing signal. Then, the signal sorting unit 250 transmits the processing signal via a communication port that is connected to a device that includes the functional unit to which the processing signal is to be transmitted. Note that if the functional unit to which the processing signal is to be transmitted is included in the device (i.e., the nearby device 20d-1) that includes the signal sorting unit, the signal sorting unit 250 transmits the processing signal directly to the functional unit, not via a communication port.

When a processing signal is transmitted from the signal sorting unit 250 to the PON interface 10d, the processing signal is first sent to the signal collecting/separating unit 160 of the software unit 101. Upon acquiring the processing signal, the signal collecting/separating unit 160 identifies a functional unit to which the processing signal is to be transmitted, by referring to destination information added to the processing signal. Then, the signal collecting/separating unit 160 transmits the processing signal to the functional unit to which the processing signal is to be transmitted, via the signal sorting unit 250.

Also, when transmitting processing signals to another functional unit, the functional units included in the software unit 101 (i.e., the device dependent app unit 102 and the device independent app unit B 201b) add destination information to the processing signals and transmit the processing signals to the signal collecting/separating unit 160.

Note that configurations of the other functional units of the communication system 1d are the same as the configurations of the functional units of the communication system 1a according to the first embodiment, and therefore the functional units are denoted with the same reference signs as those used in the first embodiment, and descriptions thereof are omitted.

As described above, in the communication system 1d according to the fourth embodiment of the present invention, communication between the functional units need not be performed via the OLT function management unit 200 that is included in a remote device 20d-2. Therefore, the communication system 1d can suppress occurrence of communication delay.

Fifth Embodiment

The following describes a fifth embodiment of the present invention with reference to the drawings.
Configuration of Communication System The following describes the functional configuration of a communication system 1e.

Figure 8:
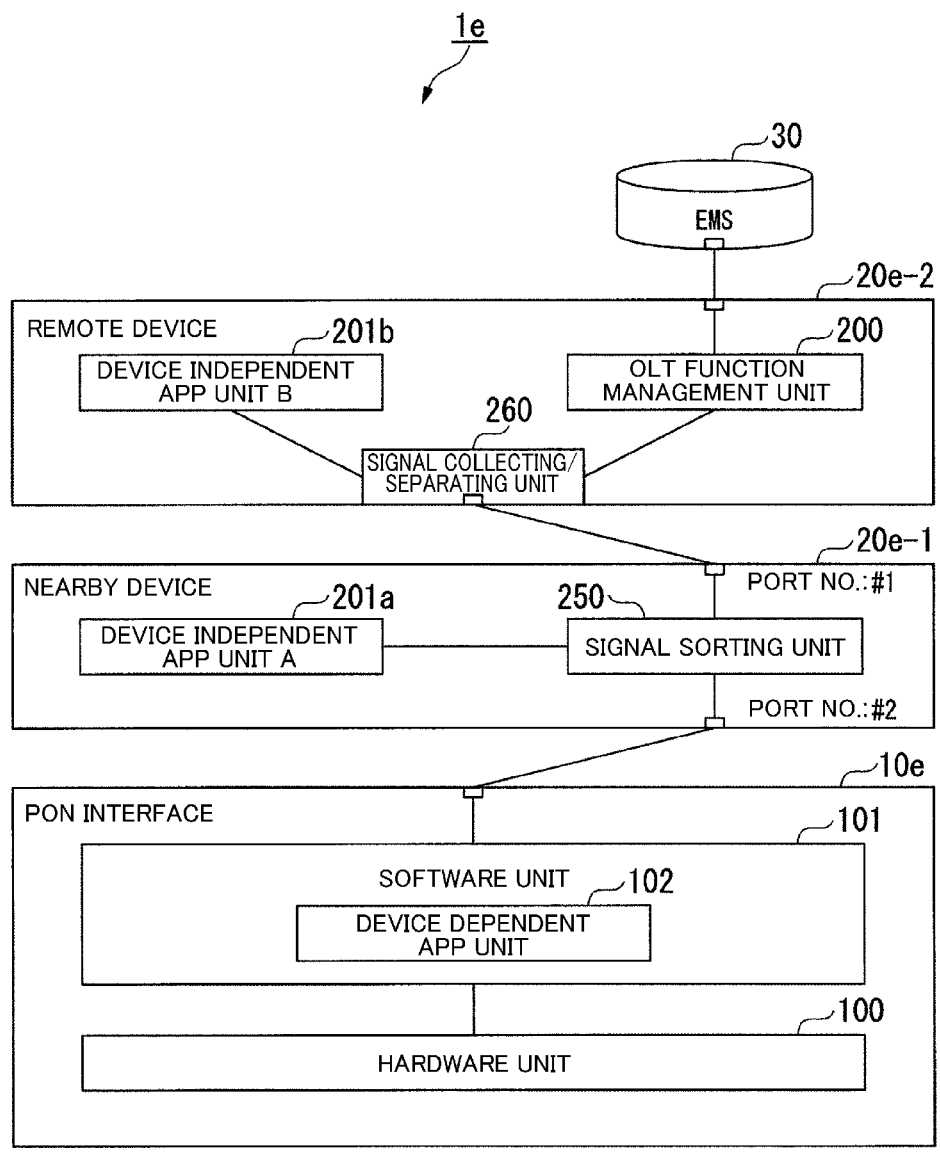
FIG. 8 is a block diagram showing a functional configuration of a communication system according to a fifth embodiment of the present invention.

FIG. 8 is a block diagram showing the functional configuration of the communication system 1e according to the fifth embodiment of the present invention.

As shown in FIG. 8, the configuration of the communication system 1e according to the present embodiment differs from the configuration of the communication system 1a according to the first embodiment described above in that at least one device independent app unit (i.e., in the present embodiment, the device independent app unit B 201b) is provided in a remote device 20e-2 that includes the OLT function management unit 200. The remote device 20e-2 includes the OLT function management unit 200, the device independent app unit B 201b, and a signal collecting/ separating unit 260.

The signal sorting unit 250 of a nearby device 20e-1 recognizes configurations of functional units (app units) included in respective devices. More specifically, the signal sorting unit 250 can refer to a list (e.g., a list shown in FIG. 9) of the functional units included in the respective devices, for example. Note that the list (management table) is stored on a storage medium (not shown) included in the nearby device 20e-1 in advance, for example.

As shown in FIG. 8, in the communication system 1e as well, processing signals transmitted from the functional units are first collected to the signal sorting unit 250 included in the nearby device 20e-1, similarly to the communication system 1a according to the first embodiment. Upon acquiring each processing signal, the signal sorting unit 250 identifies a functional unit to which the processing signal is to be transmitted, by referring to destination information added to the processing signal. Then, the signal sorting unit 250 transmits the processing signal via a communication port that is connected to a device that includes the functional unit to which the processing signal is to be transmitted. Note that if the functional unit to which the processing signal is to be transmitted is included in the device (i.e., the nearby device 20e-1) that includes the signal sorting unit, the signal sorting unit 250 transmits the processing signal directly to the functional unit, not via a communication port.

When a processing signal is transmitted from the signal sorting unit 250 to the remote device 20e-2, the processing signal is first sent to the signal collecting/separating unit 260 of the remote device 20e-2. Upon acquiring the processing signal, the signal collecting/separating unit 260 identifies a functional unit to which the processing signal is to be transmitted, by referring to destination information added to the processing signal. Then, the signal collecting/separating unit 260 transmits the processing signal to the functional unit to which the processing signal is to be transmitted, via the signal sorting unit 250.

Also, when transmitting processing signals to another functional unit, the functional units included in the remote device 20e-2 (i.e., the OLT function management unit 200 and the device independent app unit B 201b) add destination information to the processing signals and transmit the processing signals to the signal collecting/separating unit 260.

Note that configurations of the other functional units of the communication system 1e are the same as the configurations of the functional units of the communication system 1a according to the first embodiment, and therefore the functional units are denoted with the same reference signs as those used in the first embodiment, and descriptions thereof are omitted.

As described above, in the communication system 1e according to the fifth embodiment of the present invention, communication between the functional units need not be performed via the OLT function management unit 200 included in the remote device 20e-2. Therefore, the communication system 1e can suppress occurrence of communication delay.

FIG. 9 is a diagram showing an example of the above-described list that is referred to by the signal sorting unit 250. As shown in FIG. 9, the list (management table) is data in the form of a table in which a "function name" indicating the name of a functional unit, a "device name" indicating the name of a device that includes the functional unit, and a "port No." indicating the number of a communication port connected to the device are associated with each other.

As shown in FIG. 9, a "nearby device" is associated with the "device independent app unit A", and no port number is associated with the "device independent app unit A". This means that the device independent app unit A is included in the nearby device, and no port number is associated because the nearby device is the device that includes the signal sorting unit 250 and therefore a processing signal is transmitted to the nearby device not via a communication port. Also, for example, a "remote device" and a port number "#1" are associated with the "device independent app unit B". This means that the device independent app unit B is included in the remote device, and a processing signal can be transmitted to the remote device via a communication port that has the port number "#1".

As described above, in the communication systems according to the above-described embodiments of the present invention, a signal sorting function for sorting processing signals into functional units, which has been conventionally included in the OLT function management unit, is separated as the signal sorting unit 250. As a result, the location of the signal sorting function can be flexibly set according to a functional arrangement of the OLT, for example. For example, in a case where functional units that constitute a computing unit are distributed between a remote device and a nearby device, if the signal sorting unit 250 is included in the nearby device, occurrence of communication delay can be suppressed.

Also, when transmitting processing signals to another functional unit, the functional units add destination information to the processing signals. Then, the functional units transmit the processing signals to which the destination information has been added, to the signal sorting unit 250. Then, the signal sorting unit 250 sorts the processing signals based on the destination information. With this configuration, communication can be performed between the PON interface (e.g., an SFP-type OLT) and the nearby device not via the OLT function management unit 200 included in the remote device, for example.

Owing to the above-described configuration, the communication systems according to the embodiments of the present invention can transmit and receive processing signals according to a functional arrangement, and therefore can suppress occurrence of communication delay.

Note that in each of the above embodiments, a case is described as an example in which the communication system is a communication system that realizes functions of an OLT in a PON system. However, devices (or systems) to which the present invention is applied are not limited to such a system, and the above-described communication system can also be applied to an access device or a transfer device, for example.

At least a portion of the communication systems of the above-described embodiments may be realized by a computer. In such a case, a program for realizing the functions may be recorded on a computer-readable recording medium, and the functions may be realized by loading the program recorded on this recording medium to a computer system, and executing the program. Note that the "computer system" used herein includes an OS and hardware such as peripheral devices. Also, the "computer-readable recording medium" refers to a portable medium such as a flexible disk, a magneto-optical disk, a ROM, or a CD-ROM, or a storage device built in the computer system, such as a hard disk. Furthermore, examples of the "computer-readable recording medium" include a medium that dynamically holds the program for a short period of time, like a communication line when transmitting the program through a network such as the Internet or a communication line such as a telephone line, and a medium that holds the program for a certain period of time like a volatile memory in a computer system that serves as a server or a client in that case. Also, the above-described program may be a program for realizing some of the aforementioned functions, a program that can realize the aforementioned functions in combination with a program that has already been recorded in the computer system, or a program that is realized using a programmable logic device such as a FPGA (Field Programmable Gate Array).

REFERENCE SIGNS LIST 1a, 1b, 1c, 1d, 1e, 5a, 5b Communication system
10a, 10c, 10d, 10e PON interface
20a-1 Nearby device
20a-2, 20a-3 Remote device
20b-1 Nearby device
20b-2, 20b-3 Remote device
20c-1 Nearby device
20c-2, 20c-3 Remote device
20d-1 Nearby device
20d-2 Remote device
20e-1 Nearby device
20e-2 Remote device
50a, 50b PON interface
60a-1 Server
60b-1 Nearby device
60b-2, 60b-3 Remote device
100 Hardware unit
101 Software unit
102 Device dependent app unit
160 Signal collecting/separating unit
200 OLT function management unit
250 Signal sorting unit
260 Signal collecting/separating unit
500 Hardware unit
501 Software unit
502 Device dependent app unit
600 OLT function management unit

The invention claimed is:

1. A communication system comprising:
an optical line terminal;
an optical network unit interconnected via a passive optical network with the optical line terminal,
wherein the optical line terminal is comprised of a first computing device, a second computing device and a third computing device, each of the first computing device, the second computing device and the third computing device includes a processor, and a storage medium having computer program instructions stored thereon; and
communication ports that are respectfully associated with the first computing device, the second computing device and the third computing device;
wherein the first computing device functions as a passive optical network interface and the second computing device is installed in the vicinity of the first device;
wherein the third computing device is remote from the first computing device and the second computing device;
wherein, when executed by the processor, the computer program instructions on the second computing device perform to acquire a signal originating from the optical network unit that is transmitted by a first functional unit of the first computing device,
identifies a second functional unit to which the signal is to be transmitted using destination information, where the destination information identifies the second functional unit and the destination information is added to the signal by the first functional unit, and
upon the destination information indicating that the second functional unit is not included in the second computing device, accessing a management table to determine whether the signal is to be transmitted to the third computing device where each entry in the management table includes an identifier for a functional unit and an associated port number; and
transmit the signal to the second functional unit in accordance with the destination information.

2. The communication system according to claim 1, wherein the computer program instructions further perform to transmit the signal via a communication port that is associated with the second functional unit.

3. The communication system according to claim 1, wherein the computer program instructions further perform to transmit the signal based on the management table, where each entry in the management table includes an identifier for a functional unit and an associated port number.

* * * * *